No. 855,357. PATENTED MAY 28, 1907.
O. & W. K. STRENGE.
EXCAVATOR.
APPLICATION FILED OCT. 30, 1905.
3 SHEETS—SHEET 1.
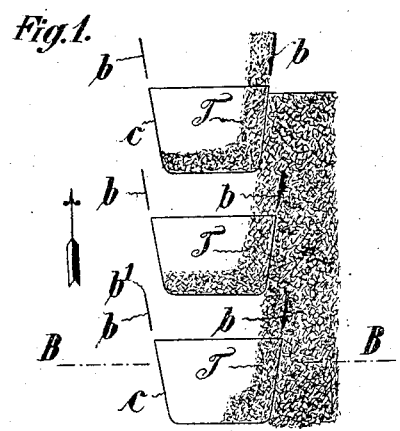
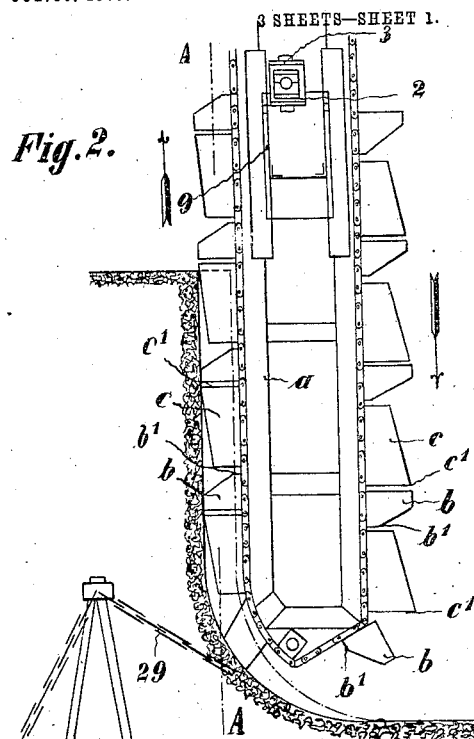
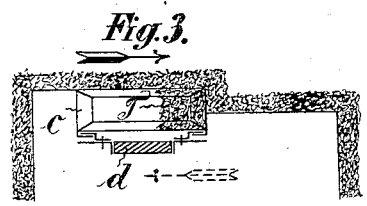
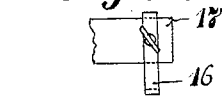
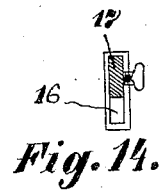
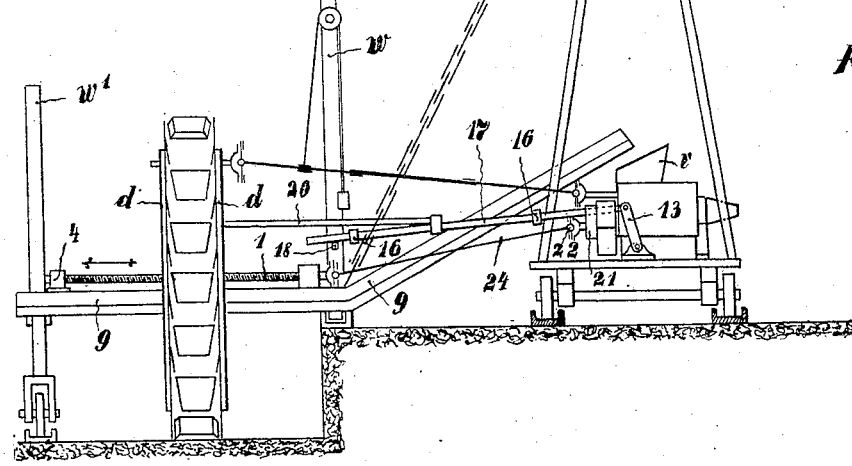
Witnesses:
Alex Scott
Geo E Garrett
Inventors,
Ottmann Strenge
Wübbo Klassen Strenge
by W Schrenborn
attorney
THE NORRIS PETERS CO., WASHINGTON, D. C.

No. 855,357. PATENTED MAY 28, 1907.
O. & W. K. STRENGE.
EXCAVATOR.
APPLICATION FILED OCT. 30, 1905.
3 SHEETS—SHEET 2.
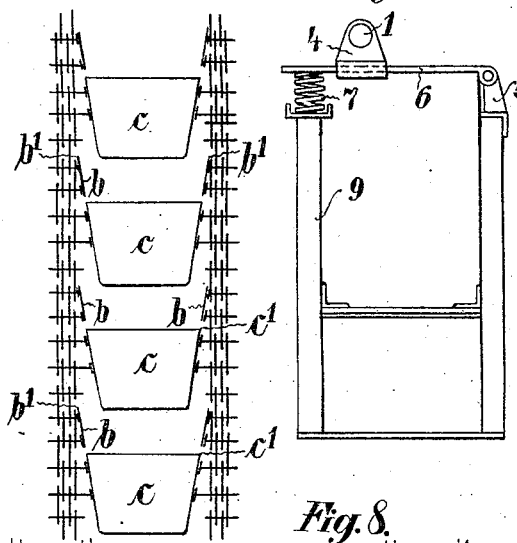
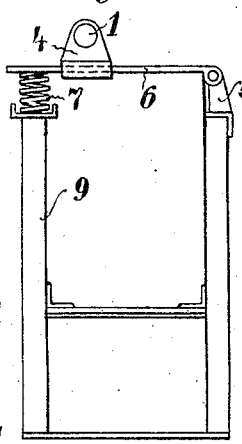
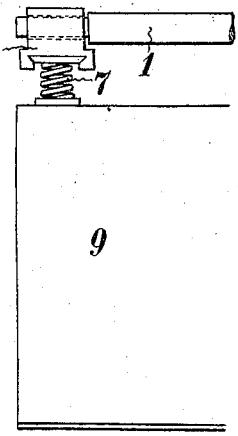
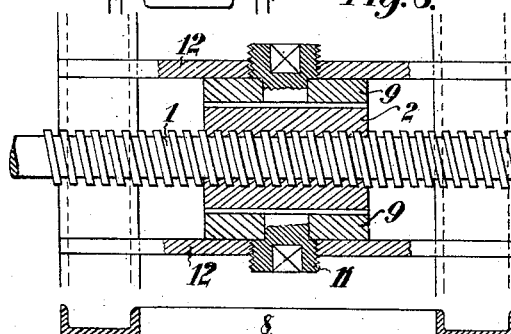
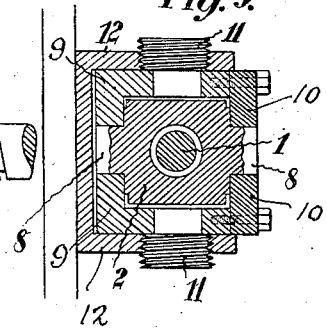
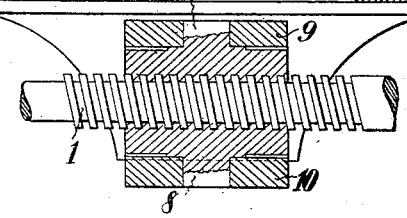
Witnesses:
Inventors,
Ottmann Strenge,
Wübbe Klassen Strenge,
by W. Gehrenborn,
Attorney No. 855,357. PATENTED MAY 28, 1907.
O. & W. K. STRENGE.
EXCAVATOR.
APPLICATION FILED OCT. 30, 1905.
3 SHEETS—SHEET 3.
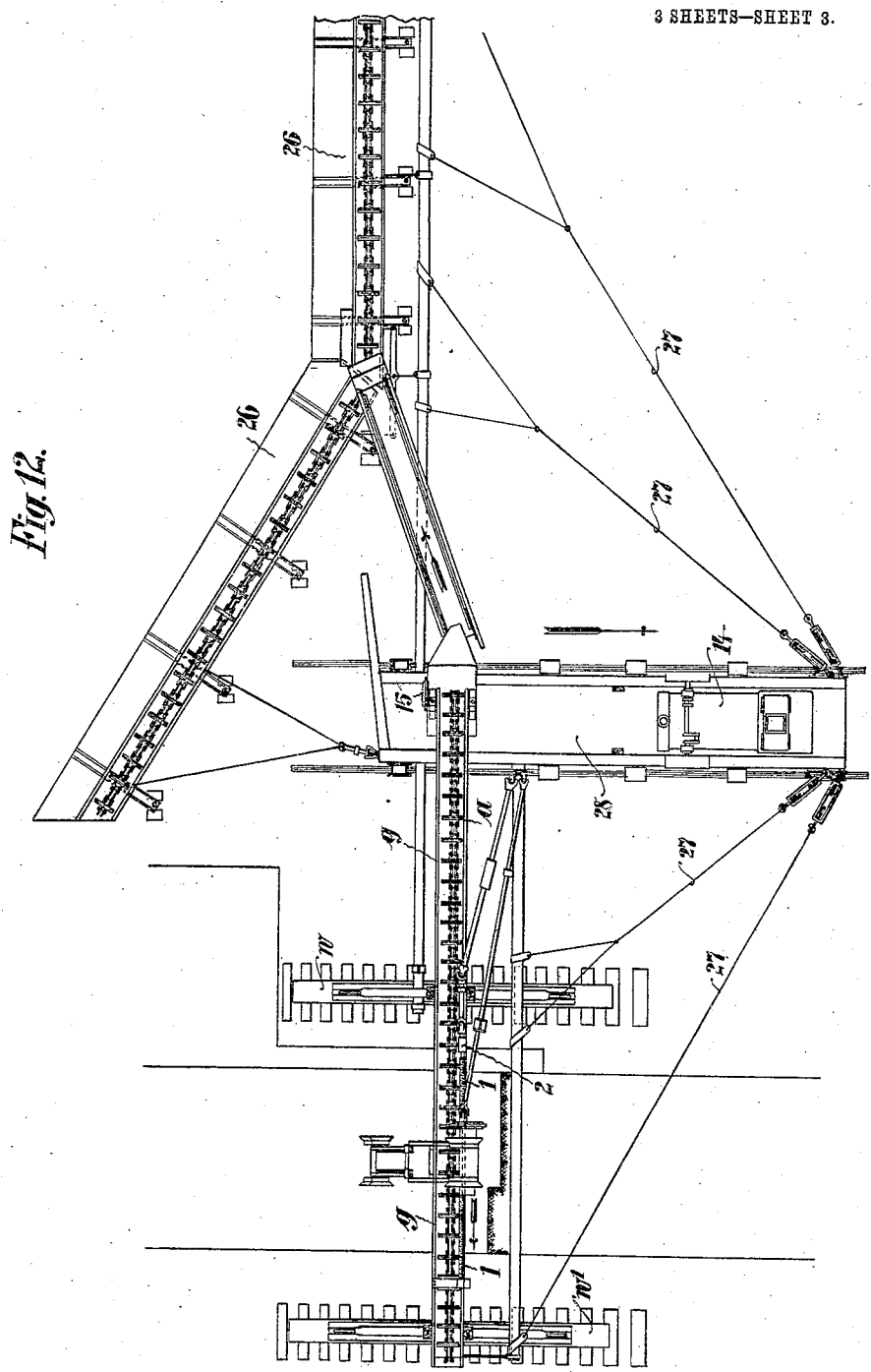

UNITED STATES PATENT OFFICE.

OLTMANN STRENGE AND WUBBO KLASSEN STRENGE, OF ELISABETHFEHN, NEAR AUGUSTFEHN, GERMANY.

EXCAVATOR.

No. 855,357.    Specification of Letters Patent.    Patented May 28, 1907.

Application filed October 30, 1905. Serial No. 285,184.

*To all whom it may concern:*

Be it known that we, OLTMANN STRENGE and WUBBO KLASSEN STRENGE, subjects of the Emperor of Germany, residing at Elisabethfehn, near Augustfehn, Grand Duchy of Oldenburg, in the Empire of Germany, have invented certain new and useful Improvements in Excavators, of which the following is a specification.

The present invention has for its object to permit of an uninterrupted and automatic operation of peat excavating machines, these advantages being obtained by modifying and adapting to the peat industry a dredging process already known in excavating. This known mode of operation consists in having the frame of a dredger chain provided with lifting buckets moved to one side simultaneously with the operative movement of the dredger chain. In excavating operations of this nature there is nothing to prevent several deep strata of earth from being excavated one after the other, the resistance set up in such operations being very efficiently overcome by having a cutting edge on the upper edge of each lifting bucket; in the case of obtaining peat, on the contrary, the entire height of the stratum of peat must be excavated at once, in order that by the mixing of the peat from all the horizontal strata, a uniform raw mass may be obtained. It is therefore extremely important to reduce as much as possible the resistance opposing the raising of the peat.

In accordance with the present invention the above stated difficulties are overcome and the object is attained by employing front cutters with the dredger chain, said chain having a double movement, as above explained, obliquely to the longitudinal direction of the chain carrying the buckets.

This modified operation of the excavator entails a special construction of the usual excavator mechanism, and the present invention relates to this latter.

My invention consists of features of construction and relative arrangement of parts as will be hereinafter more fully described and particularly pointed out in the appended claims.

In the drawings similar reference characters indicate the same elements in the different figures of drawing, in which, Figure 1 is a vertical section on the line A—A of Fig. 2, through a number of lifting buckets acting one above the other, as viewed looking toward the wall of peat to be cut. Fig. 2 is a left hand (with reference to Fig. 3) side elevation of the chain frame with the operating excavator chain. Fig. 3 is a horizontal section on the line B—B of Fig. 1. Fig. 4 is a representation of the chain itself, with buckets and cutters; Fig. 5 is a diagram of the relative movements of the chain and machine. Fig. 6 is an end view showing the yielding support of the screw spindle. Fig. 7 is a side view of the spindle support. Figs. 8, 9, and 10 are respectively sectional plan, end, and side views of the universal joint between the spindle and its yielding support. Fig. 11 is an end view of the apparatus. Fig. 12 is a top plan view of the apparatus. Figs. 13 and 14, are side and end views of the adjustable stop.

As represented, the two cutters $b$ belonging to each bucket are arranged inclined, one to the other in such a manner that the knife edges $b^1$ are further removed one from the other than the knife backs situated directly in front of the front edges $c^1$ of the knives $c$ of the corresponding bucket, see Figs. 1, 2 and 4. According as the chain frame moves toward the right hand (as is assumed in Figs. 1 and 3) or toward the left hand (as indicated with arrow in broken lines in Fig. 3) only one of each such pair of knives becomes operative as is situated upon the respective sides, while on the other hand as many of the knives situated one behind the other operate simultaneously as there is room for one above the other on the wall of the trench from which the strips of peat are to be cut. As a result a large number of comparatively narrow and therefore readily flexible strips of peat T (see Figs. 1 and 3) which settle in the succeeding collecting and conveying buckets are obtained simultaneously without difficulty. The loosening and cutting of the peat mass transversely of the cut of the cutters $b^1$ is effected by the edge of the bucket walls.

In order to permit of carrying into practice the method of operation described, the dredger mechanism is given the form illustrated diagrammatically in Figs. 11 and 12 in elevation and in plan respectively.

In this novel machine a screw spindle 1 is provided for imparting a reciprocating movement to the chain frame a. This permits of withstanding the very considerable strains arising during the lateral penetration of the cutting tools into the peat mass, better than would be the case with a cable. A spindle has also been found not to stretch as a cable does, more or less, according to the magnitude of the tractive effort to the varying resistance, as a result of which irregular displacement might occur when mechanical operation is resorted to, unless special care be taken. The nut 2 mounted upon the spindle 1 and the chain frame a should not, however, be rigidly connected one with the other, as otherwise, owing to the give or yielding which must necessarily occur in the chain frame a the spindle 1 and its supporting beam g, which is likewise formed as a conveyer channel, under working conditions, binding would necessarily result. In order to obviate such defects, the nut 2 is connected with the bucket guide by means of a universal joint at 3 (Fig. 2) and the spindle is supported at its free end, distant from the driving side, in a bearing 4 (Figs. 6, 7 and 11) which is capable of displacement upward and downward and also backward and forward, the details of which will now be described.

Referring to Figs. 6 and 7 it is shown that to one of the upper longitudinal flanges of the conveyer channel g a transverse bar 6 is suitably hinged or jointed by means of a block 5, this bar is made to rest with its free extremity upon a spring 7 bearing against the upper end of the other longitudinal flange of the channel g. Upon this bar 6 the bearing 4 which serves for the reception of the journal of the screw spindle 1, is adjustably and displaceably mounted by means of a dovetail groove, so that any movement or give of the frame of the machine is compensated by the upward and downward swinging of the bar 6 and the forward and backward displacement of the block 4.

In Figs. 8–10 is illustrated an example of the construction of the universal joint 3 referred to above.

The nut 2 mounted on the spindle 1 is provided on its front and rear sides with two horizontal tenons 8, which rest in an inclosing frame 9, 10, which is divided into two parts on each side, as shown. In this frame there engage from above and below the screws 11 which constitute tenons and rest in a frame 12 which is rigidly connected with the chain frame a and which consists of an iron member of U-section.

The novel machine is operated in such a manner that the chain frame a is caused to reciprocate in the working trench and upon each reversal is fed forward by the thickness of the strip of peat to be raised. It has proved to be advantageous to permit the reversal of the lateral movement to take place automatically. To this end I provide a reversing lever 13 (Fig. 11), which is mounted upon the truck carrying the motor 14 and the motor mechanism 15 (Fig. 12), is jointed to a rod 17 (Fig. 11) provided with two adjustable stops 16. The free extremity of this rod rests upon a projecting pin 18 of an intermediate support w for the conveyer channel g. Each of the adjustable stops 16, may consist, for example as shown in Figs. 13 and 14, of a slide embracing the rod 17 and provided with a set screw. The free end of a reversing rod 20, which is jointed to the chain frame a, engages with the rod 17 by means of a similar slide 19 (Fig. 11) and is thus afforded a bearing. At each end of the lateral displacement of the chain frame a, the slide 19 encounters the corresponding stop on the rod 17 and thus effects the reversal of the lever 13, whereby by means of an appropriate reversing gear 21 (Fig. 11) the reversal of the direction of rotation of the driving shaft for the countershaft 24 connected with the feed spindle 1 by means of the universal joint 22, 23, is effected.

Upon each reversal of the lateral movement of the chain frame the entire machine, comprising the motor 14, the chain frame a, the supporting frame w, w', for the conveyer channel g and the disintegrating machine v (Fig. 11) and also the spreading apparatus 26, (Fig. 12) is capable of being moved forward as a whole, so that it is not necessary, as in machines hitherto constructed, to displace each part separately, which causes loss of time and increases the amount of labor required. To this end all the principal parts of the machine are coupled for traction by means of horizontal chains or cables 27 (Fig. 12) which when slack rest upon the ground, with the truck 28 carrying and driven by the motor. In a similar manner the tension chains 29 (Fig. 11) serve to maintain the support w situated on the edge of the trench or pit and to prevent it from any tendency to stick owing to the yielding of the peat mass.

What I claim as new and desire to secure by Letters Patent is as follows:

1. An excavator for peat or the like material comprising an upright chain frame, an endless chain supported on said frame, means for actuating the endless chain about the frame, lifting buckets secured to the chain, means for progressively moving the frame at right angles to the movement of the buckets cutters attached to the chain and interposed between the buckets, said cutters extending obliquely outward on both sides of the buckets whereby in one displacement or movement of the chain frame transversely to the path of the chain and buckets the excavator is capable of cutting a section or strip from the wall of peat of sufficient height to obtain a uniform mixture of the peat independent of the variable height of the peat layers.

2. An excavator for peat or the like material comprising an upright chain frame, an endless chain supported on said frame, means for actuating the endless chain about the frame, lifting buckets secured to the chain, means for progressively moving the frame at right angles to the movement of the buckets consisting of a screw spindle engaging a nut having a universal connection with the chain frame, the free end of the spindle being supported in a bearing capable of vertical and lateral displacement, cutters attached to the chain and interposed between the buckets, said cutters extending obliquely outward on both sides of the buckets whereby in one displacement or movement of the chain frame transversely to the path of the chain and buckets the excavator is capable of cutting a section or strip from the wall of peat of sufficient height to obtain a uniform mixture of the peat independent of the variable height of the peat layers.

3. An excavator for peat or the like material comprising an upright chain frame, an endless chain supported on said frame, means for actuating the endless chain about the frame, lifting buckets secured to the chain, means for progressively moving the frame at right angles to the movement of the buckets, consisting of a screw spindle engaging a nut having a universal connection with the chain frame, the free end of the spindle being supported in a bearing capable of vertical and lateral displacement, means for automatically reversing the screw spindle, cutters attached to the chain and interposed between the buckets, said cutters extending obliquely outward on both sides of the buckets whereby in one displacement or movement of the chain frame transversely to the path of the chain and buckets the excavator is capable of cutting a section or strip from the wall of peat of sufficient height to obtain a uniform mixture of the peat independent of the variable height of the peat layers.

4. An excavator for peat or the like material comprising a chain frame, an endless chain supported on said frame, means for actuating the endless chain about the frame, lifting buckets secured to the chain, means for progressively moving the frame at right angles to the movement of the buckets, cutters attached to the chain and interposed between the buckets, said cutters extending obliquely outward on both sides of the buckets whereby in one displacement or movement of the chain frame transversely to the path of the chain and buckets the excavator is capable of cutting a section or strip from the wall of peat of sufficient height to obtain a uniform mixture of the peat independent of the variable height of the peat layers, means for displacing the excavator as a whole with its operating mechanism in the direction of the path of the endless chain or substantially at right angles to the direction of movement of the chain frame.

5. An excavator for peat or the like material comprising an upright chain frame, an endless chain supported on said frame, means for actuating the endless chain about the frame, lifting buckets secured to the chain, means for progressively moving the frame at right angles to the movement of the buckets, consisting of a screw spindle engaging a nut having a universal connection with the chain frame, the free end of the spindle being supported in a bearing capable of vertical and lateral displacement, means for automatically reversing the screw spindle, consisting of a reversing rod controlling the means for actuating the chain frame and adjustable stops on the rod engaged by the chain frame, cutters attached to the chain and interposed between the buckets, said cutters extending obliquely outward on both sides of the buckets whereby in one displacement or movement of the chain frame transversely to the path of the chain and buckets the excavator is capable of cutting a section or strip from the wall of peat of sufficient height to obtain a uniform mixture of the peat independent of the variable height of the peat layers.

6. An excavator for peat or the like material comprising an upright chain frame, an outer support $w'$ and an inner support $w$ adapted to receive the weight of the chain frame, a motor truck, means for transmitting the weight of the inner support $w$ to the motor truck, an endless chain supported on said frame, means for actuating the endless chain about the frame on said truck, lifting buckets secured to the chain, means for progressively moving the frame at right angles to the movement of the buckets, cutters attached to the chain and interposed between the buckets, said cutters extending obliquely outward on both sides of the buckets whereby in one displacement or movement of the chain frame transversely to the path of the chain and buckets the excavator is capable of cutting a section or strip from the wall of peat of sufficient height to obtain a uniform mixture of the peat independent of the variable height of the peat layers.

In testimony whereof we have hereunto set our hands in presence of two subscribing witnesses this 17th day of October, 1905.

OLTMANN STRENGE.
WUBBO KLASSEN STRENGE.

Witnesses:
   FR. HOYERMANN,
   F. REICHY.